United States Patent [19]

Fujii et al.

[11] Patent Number: 4,794,032
[45] Date of Patent: Dec. 27, 1988

[54] FLOOR STRUCTURE

[75] Inventors: Hideichi Fujii, Kobe; Kiyomori Nakano, Akashi, both of Japan

[73] Assignee: Kawasaki Jukogyo Kabushiki Kaisha, Kobe, Japan

[21] Appl. No.: 14,321

[22] Filed: Feb. 13, 1987

[30] Foreign Application Priority Data

Feb. 13, 1986 [JP] Japan .................................. 61-29977

[51] Int. Cl.⁴ ........................ B32B 3/00; B61D 17/00; C09K 2/10

[52] U.S. Cl. .................................... 428/209; 105/396; 105/422; 252/601; 252/602; 252/603; 252/604; 252/605; 252/606; 428/913; 428/920; 428/921

[58] Field of Search ...................... 105/396, 422, 423; 252/601–606; 428/913, 920, 921, 209

[56] References Cited

U.S. PATENT DOCUMENTS 2,245,529  6/1941  Lundvall .............................. 105/422
3,699,041 10/1972  Sanderford et al. ................ 252/601
4,255,482  3/1981  Udagawa ............................ 428/215
4,397,906  8/1983  Nakagawa .......................... 428/195

FOREIGN PATENT DOCUMENTS 2045277  3/1972  Fed. Rep. of Germany ...... 105/422
0212928  8/1984  Fed. Rep. of Germany ...... 105/422

Primary Examiner—John E. Kittle
Assistant Examiner—P. J. Ryan
Attorney, Agent, or Firm—Schwartz & Weinrieb

[57] ABSTRACT

A floor structure comprising an upper layer containing a hydroxide, a middle layer for providing the structural strength and a lower layer covering the lower surface of the structure, in which at least the middle layer and the lower layer are composed of flame-retardant material and a layer of heat insulating material is formed therebetween. The floor structure is excellent in fire-resistance and heat-resistance, as well as facilitating the mounting of equipment or the likes below the floor.

13 Claims, 10 Drawing Sheets

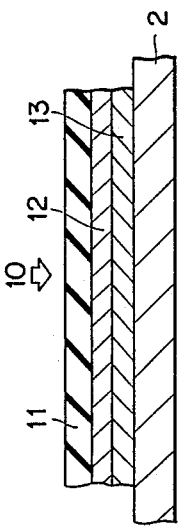
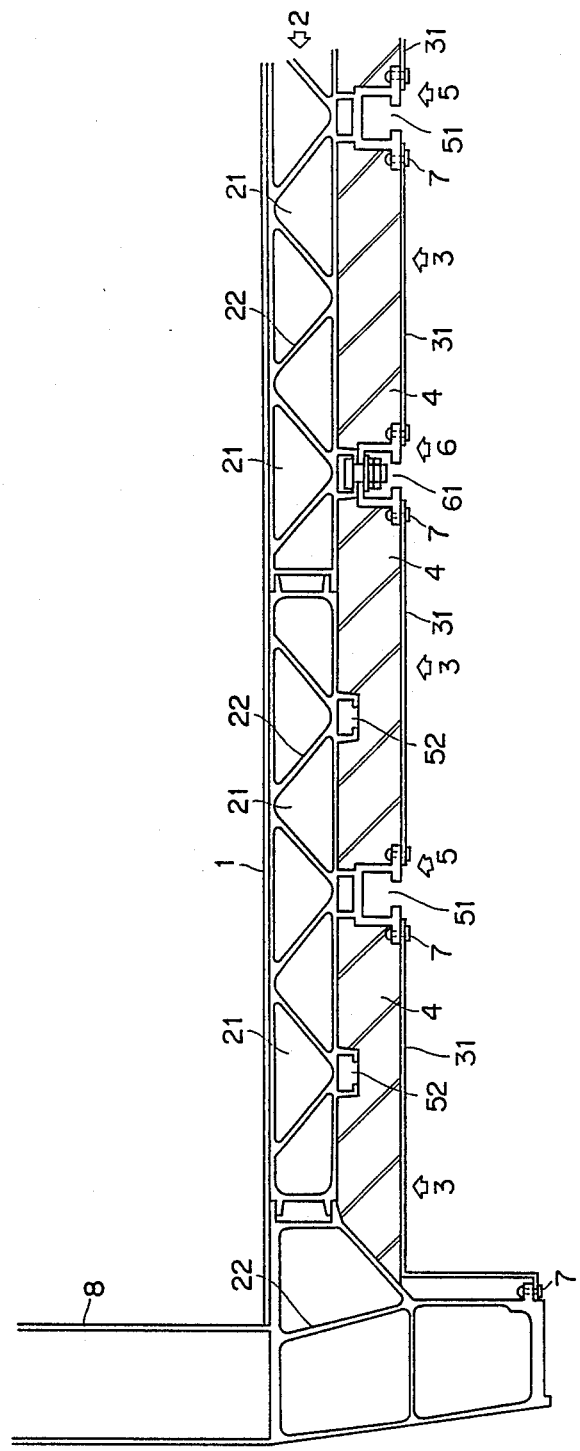
FIG. 2
FIG. 3

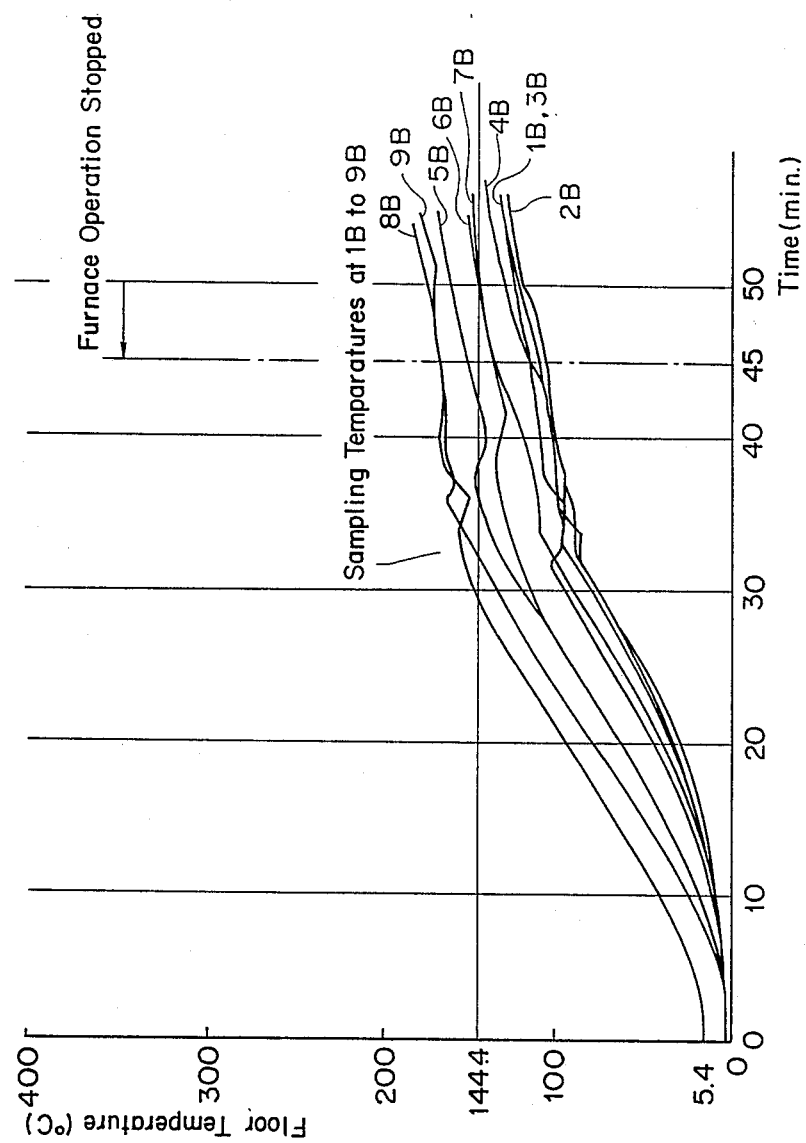

FLOOR STRUCTURE

FIELD OF THE INVENTION

This invention concerns a floor structure for use in vehicles such as railroad vehicles or buses, ships, buildings or the like in which equipment is suspended below the floor and wherein special considerations have to be accounted for in connection with fire accidents.

BACKGROUND OF THE INVENTION

In a conventional floor structure, while heat-resistant materials, for example, plaster boards or concrete have usually been employed for fire-resistance and heat-resistance upon the occurrence of fire accidents, those floor structures requiring reduced weight and high strength have often been made of metal. As an example, there has been known such a metal structure as disclosed in Japanese Patent Laid Open No. Sho 60-234065 in which heat insulating material is appended on both of the upper and the lower surfaces of a metal floor structure and the lower surface is covered with a steel plate.

However, in the above-mentioned floor structure of the prior art, although the melt destruction of the floor structure can be prevented even when the temperature rise is abrupt, sufficient time cannot be ensured for the escape of passengers, particularly, in vehicles. Furthermore, in the case of suspending equipment or the like below the floor, it is necessary that the equipment has to be attached directly to the floor structure by passing the same through the metal plate of the lower surface of the floor structure so as to be attached to the beams of the floor structure. In this case, it is necessary to partially remove some of the heat insulating material, or to provide additional beams upon the lower side of the metal plate, which leads to problems in view of the installation work and the structural design.

In addition, if a floor structure cannot satisfy the fire-resistance standards of ASTM E-119 in the United States, it cannot be put to actual use for vehicles in the United States and other countries which apply this standard. If is accordingly necessary to provide such a floor structure which is capable of satisfying these standards and, in addition, resolving the problems in view of the installation work and the structural design as described above.

In the United States, a method of performing a fire-resistance test is specified in ASTM E-119 Standard Methods of Fire Tests of Building Construction and Materials. According to this standard, the allowable limit for the temperature rise in the structure and the material is defined as less than 250° F. (139° C.).

Furthermore, according to the standards for the vehicles in Chapter 4 of American Standards NFPA 130 FIXED GUIDEWAY TRANSIT SYSTEM, it is specified that the conditions should at least be according to ASTM E-119. Thus, the temperature has to be maintained below the standard for at least 15 minutes or for a period in which the passengers can escape and it will be apparent that the known techniques or structures as have been described above cannot meet these requirements.

OBJECT OF THE INVENTION

It is an object of this invention to provide a floor structure which is excellent in fire-resistance and heat-resistance, as well as capable of facilitating the mounting of equipment below the floor.

SUMMARY OF THE INVENTION

The foregoing object of this invention can be attained by means of a floor structure comprising an upper layer containing a hydroxide, a middle layer providing the structural strength and a lower layer covering the lower surface of the structure, in which at least the middle layer and the lower layer are composed of flame-retardant material and a layer of heat insulating material is interposed therebetween.

Furthermore, according to this invention, the hydroxide is disposed throughout, or at least a portion of, the upper layer so that the temperature rise may be suppressed due to steam released from the hydroxide upon heating, a heat insulating effect can be obtained by means of the heat insulating material between the middle layer and the lower layer, the lower layer is adapted to be secured upon a mounting layer disposed to the middle layer or to a connection member attached to the middle layer, and a T-shaped groove is formed within the mounting portion or connection member and is exposed to the outside of the floor structure.

BRIEF DESCRIPTION OF THE ACCOMPANYING DRAWINGS

These and other objects, as well as advantageous features of this invention will become apparent by reading the following description for the preferred embodiment of this invention while referring to the accompanying drawings, wherein:

FIG. 2 is a view showing an example for the constitution of a sheet used in this invention;

FIG. 3 is a cross sectional view illustrating the mounting relationship between the floor structure and the lower plate in this invention;

FIG. 8 is a graph of a curve illustrating the floor temperature versus time illustrating the temperature variation in the chamber.

DETAILED DESCRIPTION OF THE INVENTION

Figure 1:
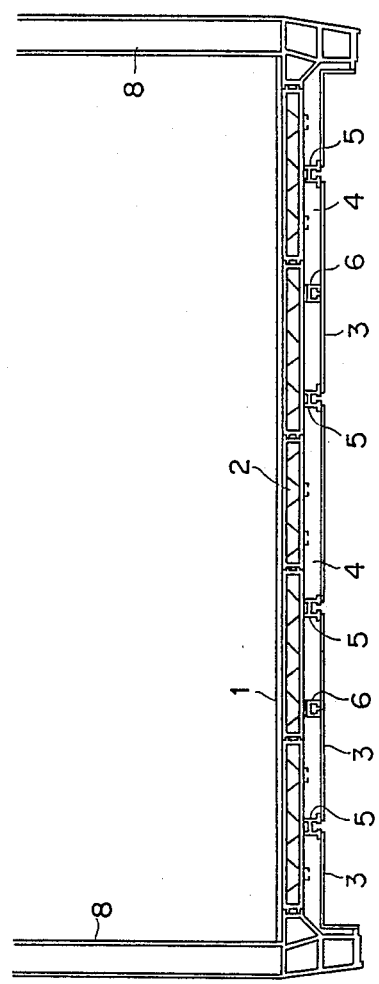
FIG. 1 is an entire view illustrating the schematic constitution for one embodiment according to this invention.

FIG. 1 is an entire view for one embodiment according to this invention, in which upper layer 1 is at least composed of a floor sheet comprising rubber containing a hydroxide or the like. The layer constitutes the floor surface in the chamber and, when it is heated from the external fire, the water ingredient contained in the layer evaporates as steam and provides the heat of vaporization so as to thereby suppress the temperature rise in the floor structure as a result in the change of state of the material.

Middle layer 2 is made of flame retardant material such as metal for insuring the strength of the floor and serves as a safety structure for preventing the spread of the combustion and providing the safety during the escape of the passengers. Furthermore, by disposing spaces in the middle layer, cooling and heat insulating effects can be achieved, and the strength an be improved irrespective of reduced weight.

Lower layer 3 is directly exposed of the fire and is composed of flame retardant material. Heat insulating effects can be improved and the main structure can be protected against the fire by disposing heat insulating material 4 between the lower layer 3 and the middle layer 2. The lower layer 3 is attached directly to middle layer 2 by means of dependent mounting portions 5 integrally formed with the middle layer 2, or indirectly to the middle layer 2 by means of connection members 6. In the drawing, reference numeral 8 represents a wall.

EXAMPLE

FIG. 2 is a view illustrating an example of a sheet constituting the upper layer 1 according to this invention, in which the sheet 10 is made of a three-layered material. Surface layer 11 is preferably made of rubber or other material having high abrasion resistance and a cushioning function. Middle layer 12 is made of blended rubber material of low heat conductivity. Rear face 13 is made of rubber or other material containing a hydroxide, which releases water of crystallinity upon heating so as to release heat within sheet 10 and middle layer 2 thereby suppressing the overall temperature rise.

As the hydroxide, aluminum hydroxide ($Al_2O_3$—$3H_2O$) or magnesium hydroxide is appropriate, as well as a hydroxysalt such as $2Al_2(OH)_3$, $Mg(OH)_2$, or an aquocomplex salt such as $CaCl_2$—$6H_2O$, $Na_2SO_3$—$7H_2O$, or the like, and in addition, sodium sulfite can also be utilized.

The middle layer 12 is preferably made of a material, for example, having a heat conductivity of less than 0.35 Kcal/m.h.deg and the blending material useable therefor may include granular cork, wood dust, glass, ceramic micro balloons, fiber dust, and cotton dust.

The blending for the material of the sheet in the example used for the fire resistance test described later is as below:

| Blending Agent | Parts By Weight |
|---|---|
| Surface Layer 11 | |
| SBR #1500 (IISRP Standard) | 70 |
| high styrene SBR | 30 |
| hard clay | 150 |
| light calcium carbonate | 70 |
| Naphthenic oil | 3 |
| Zinc powder | 5 |
| Stearic acid | 2 |
| vulcanization accelerator (dibenzo thiozyl disulfide) | 2.5 |
| vulcanization accelerator (TMTM-tetra methyl thiuram mono-sulfide) | 0.2 |
| Sulfur | 5 |
| Total | 337.7 |
| Middle Layer 12 | |
| Natural rubber (RSS-4 - ribbed smoked sheet No. 4 natural rubber product grade) | 50 |
| Regenerated rubber | 100 |
| light calcium carbonate | 50 |
| Granular cork | 60 |
| Zinc powder | 5 |
| Stearic acid | 2 |
| vulcanization accelerator (OBS- N—oxydiethylene-2-benzosulfenamide) | 1.2 |
| Sulfur | 3 |
| Total | 271.2 |
| Rear Face Layer 13 | |
| Natural rubber (RSS-4) | 50 |
| Regenerated rubber | 100 |
| Aluminum hydroxide | 100 |
| Zinc powder | 5 |
| Stearic acid | 2 |
| Vulcanization accelerator (OBS) | 1.2 |
| Sulfur | 3 |
| Total | 261.2 |

In blending the ingredients as described above, the temperature upon releasing the water of crystallinity is from 150°-300° C. Furthermore, the thickness and the heat conductivity for each of the layers are as below:

| Surface layer | 2 mm | 0.410 Kcal/m.h.deg |
|---|---|---|
| Middle layer | 1.5 mm | 0.210 Kcal/m.h.deg |
| Rear face layer | 1.5 mm | 0.380 Kcal/m.h.deg |

For the upper layer, it is sufficient that the layer has properties superior to the example as described above and other layer constitutions may be employed as required.

FIG. 3 shows one example for the middle layer 2 according to this invention, in which structure 21 is constituted by combining several blocks 22 made of an aluminum extrusion molded material and joined by welding or the like. It comprises a hollow structure so that high strength can be obtained as well as reduced weight.

Mounting portion 5 is disposed toward the bottom of the structure 21 and the T-shaped grooves disposed therein serve to secure the heads of mounting bolts upon suspending equipment below the floor. Bottom plate 31 corresponding to the lower layer 3 is disposed between the mounting portions 5 and is attached thereto by means of known fastening means 7 such as bolts and rivets. Since the bottom plate 31 is directly exposed to the fire upon the occurrence of a fire accident from the equipment below the floor or outside of the chamber, it is required that the material for the lower plate 31 be flame-retardant. Thin stainless steel plates were used in the fire resistant test.

While only the necessary portions of the T-shaped grooves 51 in the mounting portion are exposed externally, unnecessary portions of the T-shaped grooves 52 are not exposed. However, similar T-shaped grooves have to be prepared as required depending upon the case where the equippment is to be installed below the floor. In this case, the function of each T-shaped groove 52 is extended, by means of connection member 6, to the lower plate 31. In this case, each connection member 6 is attached through means of a required distance to the T-shaped groove 52 by means of bolts and nuts, and the T-shaped groove 61 defined within the connection member 6 is used for mounting the equipment. Furthermore, a recess is defined within the lower plate 31 so as to expose the above-mentioned portion 52, and the lower plate 31 and the connection member 6 are secured together as required. Glass fiber or ceramic fiber is inserted as heat insulating material 4 in the space between the structure 21 and the lower plate 31. The heat insulating material 4 is a normally commercially available material known as flame-retardant material.

Figure 4:
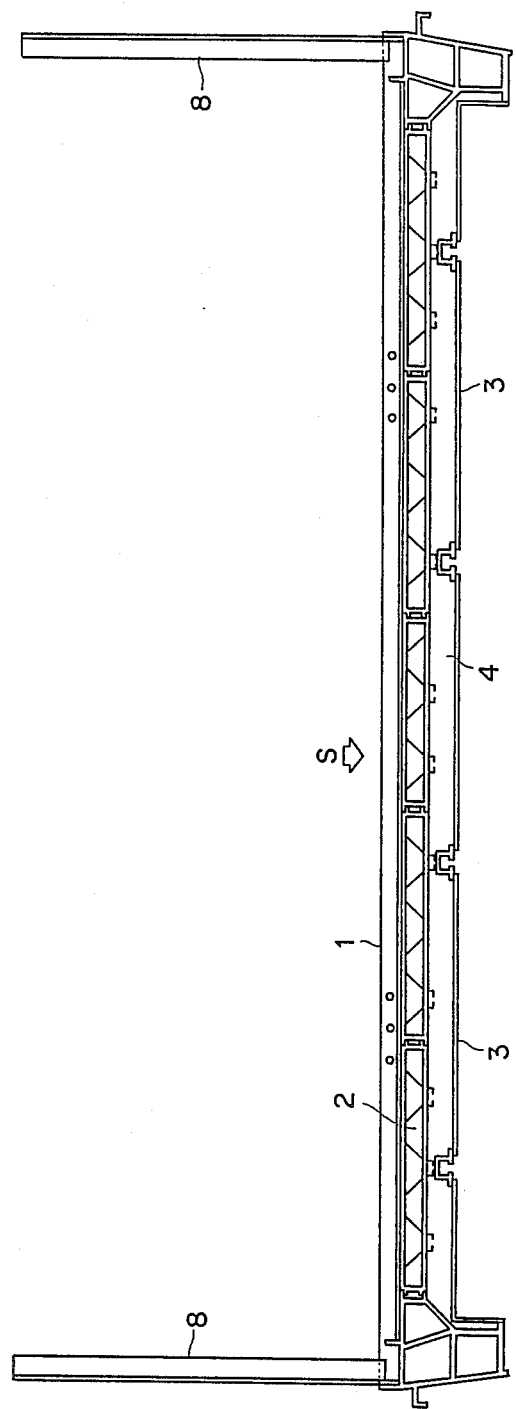
FIG. 4 is a cross sectional view for the specimen 5 used for the fire-resistance test.

For the constitution of the example as described above, fire-resistant tests based upon the above-mentioned ASTM E-119 were carried out. The outline of the results of the tests is described below. FIG. 4 shows the specimen S used for the fire-resistance test. Although the specimen S is different in size from that designated by the standards, since the size of the actual product (vehicle in this case) is smaller than the specified size, other conditions are identical with those in the standards.

Figure 5A:
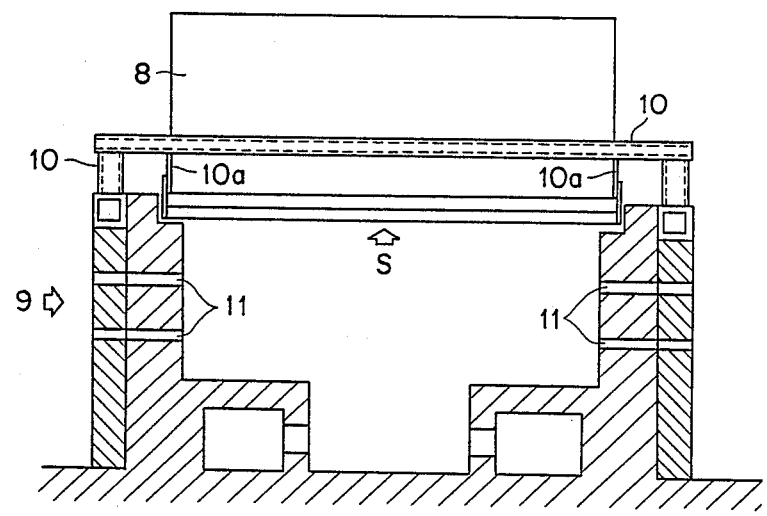
FIGS. 5a and 5b are explanatory views illustrating the relationship between the furnace and the specimen S used for the fire-resistance test.
Figure 5B:
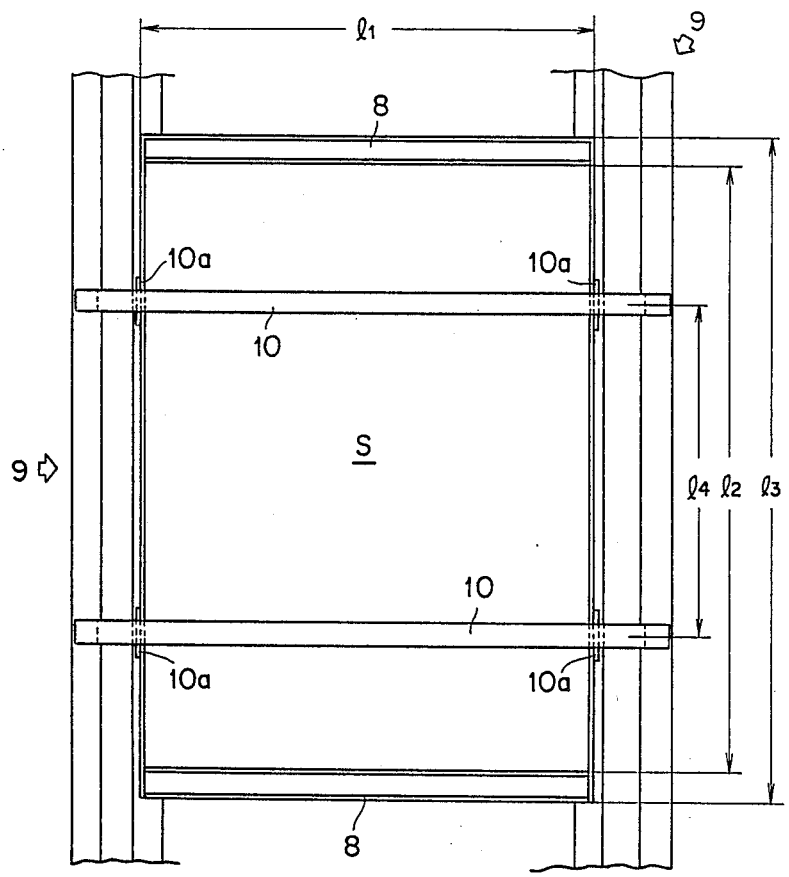
Figure 6:
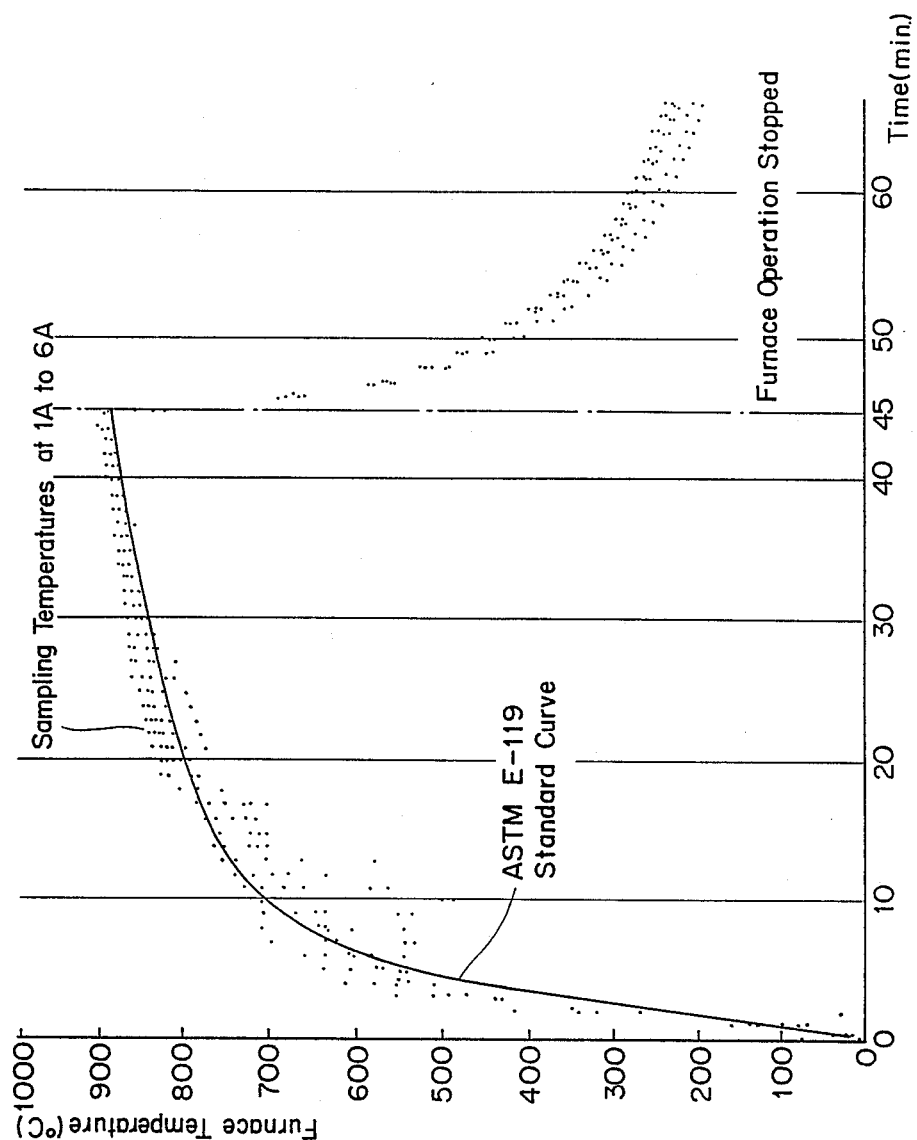
FIG. 6 is a graph for the curve illustrating the furnace temperature versus time for the variation of the outside temperature.
Figure 7A:
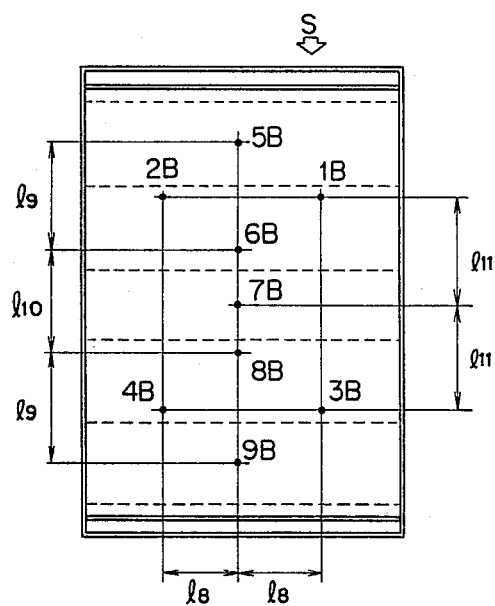
FIGS. 7a, 7b and 7c are explanatory views illustrating the positions for measuring the temperature.
Figure 7B:
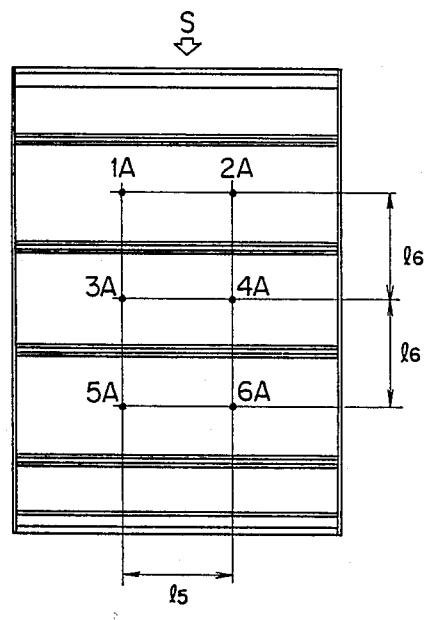
Figure 7C:
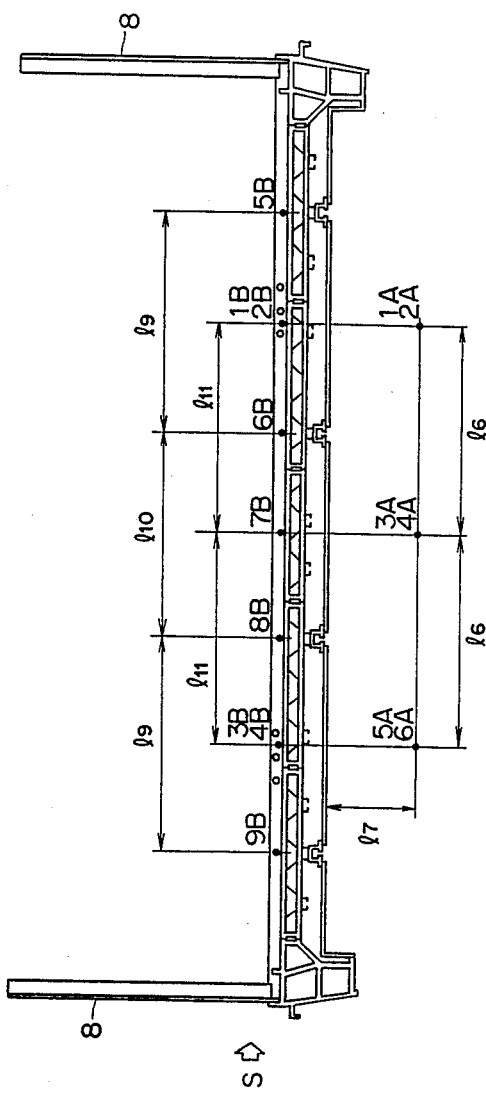

FIG. 5a shows the cross section of furnace 9 used for the fire-resistance test and the setting state of the specimen S and FIG. 5b is a plan view thereof. The specimen S is suspended by means of hangers 10a suspended from fixed members 10 and thus assumed loads of 324 kg/m$^2$ (equipment 145 kg/m$^2$+passenger 179 kg/m$^2$) are applied over the entire surface of the floor ($l_1$—2.12 m×$l_2$—2.85 m). The longitudinal size $l_3$ for the specimen S including the wall 8 is 3.064 m and the distance $l_4$ between the fixed members 10 is 1.50 m. The total load is 1958 kg. The entire length of the furnace is 7 m and the furnace is heated from both sides thereof by means of combustion of burners 11. The value for the temperature variation in the furnace 9 is defined in ASTM E-119 and a 10% variation is allowable relative to the value shown by means of the solid line in FIG. 6. The positions for arranging thermocouples A, B for sampling the temperature are as shown in FIGS. 7a, 7b and 7c, by which the temperature for the furnace 9 is measured at each of the points from 1A through 6A, while the temperature for the specimen S is measured at each of the points from 1B through 9B disposed at the floor surface by means of other thermocouples. Furthermore, cotton pieces are placed at each of the points from 1B to 9B so as to simultaneously confirm whether they are ignited so as to burn or not.

It is noted that the thermocouples A are disposed within the furnace 9, for example, at six positions 1A–6A, while the thermocouples B attached to the specimen S are disposed, for example, at 9 positions 1B–9B. As shown in FIGS. 7b, 7c, the thermocouples A are disposed in two rows in the longitudinal direction of the specimen S, specifically, in the row: 1A, 3A, 5A and in the row: 2A, 4A, 6A, the distance $l_5$ relative to the lateral direction of the specimen S between 1A and 2A, 3A and 4A, and 5A and 6A is 720 mm, the distance $l_6$ relative to the longitudinal direction of the specimen S between 1A, 2A and 3A, 4A, and 3A, 4A and 5A, 6A is 690 mm and the distance $l_7$ between 1A–6A and the bottom of the lower layer of the specimen 8 is 305 mm.

Furthermore, as shown in FIG. 7a, the thermocouples B are disposed in three rows along the longitudinal direction of the specimen S, specifically, in a row 2B and 4B on one side of the specimen S, in a row of 5B, 6B, 7B, 8B and 9B at the center of the specimen S and in a row of 1B and 3B on the other side of the specimen S, in which the distance $l_8$ in the lateral direction of the specimen S between the row 2B, 4B and the row 5B–9B is 540 mm, the distance $l_8$ in the lateral direction of the specimen S between the row 1B, 3B and the row 5B through 9B is 540 mm, while the longitudinal distance $l_9$ between 5B and 6B, 8B and 9B is 700 mm, the longitudinal distance $l_{10}$ between 6B and 8B is 680 mm and the longitudinal distance $l_{11}$ between 1B (2B) and 7B, and 7B and 3B (4B) is 690 mm respectively.

According to the assumption, the average value for the temperature rise at each of the points should not go higher tha 139° C. (250° F.) and the time required for causing such a temperature rise forms the reference for the judgement.

According to the experiment, the average temperature up to 5.4°+139°=144.4° C. is allowable in the case of a temperature rise of 139° C. from the initial average temperature of 5.4° C. at each of the points on the floor.

FIG. 8 shows the mode of temperature change. Approximately 45 minutes are required after the ignition until the average temperature from each of the measuring points 1B–9B reaches 144.4° C. The average temperature rise at each of the points after the elapse of 45 minutes is 135.8° C. Furthermore, the cotton pieces were not ignited, and the structure was not damaged or destroyed due to the applied load.

This means that the floor structure according to this invention can satisfy the standards of ASTM E-119 at least for 45 minutes after the occurrence of a fire accident showing that no fire occurs within the chamber, no high temperature as disclosed in the aforementioned literature is attained and sufficient time can be provided for the escape of the passengers.

According to this invention, since the upper layer is constituted with a sheet containing a hydroxide, the lower layer is constituted with a flame-retardant plate, the middle layer is constituted with a flame-retardant and strength member and heat insulating material is disposed between the lower layer and the middle layer, a remarkable advantageous effect of providing an excellent flame-retardant and heat-resistant floor structure as compared with the known floor structure can be provided.

Furthermore, since T-shaped grooves are defined within the mounting portions of the lower plate, or the connection members are disposed within the middle layer and only the grooved portions are exposed to the outside, advantageous effects such as facilitating the mounting of equipment or the like below the floor without degrading the fire-resistant and heat-resistant properties that cannot be obtained so far in the prior art, can be realized with the present invention.

Obviously, many modifications and variations of the present invention are possible in light of the above teachings. It is therefore to be understood that within the scope of the appended claims, the present invention may be practiced otherwise than as specifically described herein.

What is claimed is:

1. A floor structure, comprising:
   a self-supporting structural member, for providing structural strength to said floor structure, fabricated from a flame-retardant material and having an upper and lower surface;
   an upper layer, secured to said upper surface of said self-supporting structural member, selected from materials comprising either a hydroxide, a hydrated salt, or an aquo-complex salt, which are thermally decomposable so as to release water under heated conditions;
   a layer of heat insulating material secured to said lower surface of said self-supporting structural member; and
   a lower layer secured to an undersurface of said heat insulating layer and formed of flame-retardant material.

2. A floor structure as set forth in claim 1, wherein: said self-supporting structural member is fabricated from aluminum.

3. A floor structure as set forth in claim 1, wherein:

said lower layer is fabricated from stainless steel.

4. A floor structure as set forth in claim 1, wherein: said self-supporting structural member comprises a truss-type structural beam.

5. A floor structure as set forth in claim 1, wherein said upper layer comprises:
an upper sub-layer including rubber and hard clay for exhibiting high abrasion resistance;
an intermediate sub-layer including rubber for low heat conductivity; and
a lower sub-layer including rubber and a hydroxide for exhibiting thermal decomposition.

6. A floor structure as set forth in claim 5, wherein: said upper sub-layer further comprises light calcium carbonate and said rubber is SBR.

7. A floor structure as set forth in claim 5, wherein: said intermediate sub-layer further comprises light calcium carbonate and granular cork.

8. A floor structure as set forth in claim 5, wherein: said hydroxide in said lower sub-layer is aluminum hydroxide.

9. A floor structure as set forth in claim 1, wherein: said heat insulating material comprises glass fibers.

10. A floor structure as set forth in claim 1, wherein: said heat insulating material comprises ceramic fibers.

11. A floor structure as set forth in claim 1, further comprising:
mounting means integrally formed upon said lower surface of said self-supporting structural member and depending downwardly therefrom for fixedly mounting said lower layer thereon with said heat insulating material interposed between said lower surface of said self-supporting structural member and said lower layer.

12. A floor structure as set forth in claim 11, wherein: said mounting means has defined therein a plurality of T-shaped groove means for receiving fastening means by which equipment may be suspendingly supported beneath said floor structure.

13. A floor structure as set forth in claim 1, further comprising:
mounting means integrally formed upon said lower surface of said self-supporting structural member and depending downwardly therefrom; and
connecting members, secured to said mounting means, for indirectly securing said lower layer to said self-supporting structural member with said heat insulating material interposed between said lower surface and said lower surface of said self-supporting structural member.

* * * * *